US008145715B2

(12) United States Patent
Henry et al.

(10) Patent No.: US 8,145,715 B2
(45) Date of Patent: Mar. 27, 2012

(54) OFF-THE-RECORD E-MAIL METHODS AND APPARATUS

(75) Inventors: Paul S. Henry, Holmdel, NJ (US); Hui Luo, Old Bridge, NJ (US)

(73) Assignee: AT&T Intellectual Property II, New York, NY (US)

( * ) Notice: Subject to any disclaimer, the term of this patent is extended or adjusted under 35 U.S.C. 154(b) by 1918 days.

(21) Appl. No.: 11/029,290

(22) Filed: Jan. 5, 2005

(65) Prior Publication Data

US 2006/0149822 A1 Jul. 6, 2006

Related U.S. Application Data

(63) Continuation of application No. 09/456,983, filed on Dec. 7, 1999, now abandoned.

(60) Provisional application No. 60/155,650, filed on Sep. 24, 1999.

(51) Int. Cl.
*G06F 15/16* (2006.01)
(52) U.S. Cl. ....................................................... 709/206
(58) Field of Classification Search .................... 709/206
See application file for complete search history.

(56) References Cited

U.S. PATENT DOCUMENTS

| 5,781,901 | A | * | 7/1998 | Kuzma | 707/10 |
| 5,930,471 | A | * | 7/1999 | Milewski et al. | 709/204 |
| 5,958,005 | A | * | 9/1999 | Thorne et al. | 709/202 |
| 6,023,723 | A | * | 2/2000 | McCormick et al. | 709/206 |
| 6,122,632 | A | * | 9/2000 | Botts et al. | 707/10 |
| 6,128,740 | A | * | 10/2000 | Curry et al. | 713/158 |
| 6,449,637 | B1 | * | 9/2002 | Toga | 709/206 |
| 6,557,029 | B2 | * | 4/2003 | Szymansky | 709/206 |
| 7,149,893 | B1 | * | 12/2006 | Leonard et al. | 713/154 |

OTHER PUBLICATIONS

Stevens. TCP/IP Illustrated, vol. 1: The Protocols. Chapter 28, SMTP. pp. 378-394.*
Mak et al. "Leveraging Traditional EDI Investment Using the Internet: A Case Study". IEEE. Proceedings of the 32nd Hawaii International Conference on System Sciences, Jan. 5-8, 1999.*

* cited by examiner

*Primary Examiner* — John MacIlwinen
(74) *Attorney, Agent, or Firm* — Peter V. D. Wilde

(57) ABSTRACT

This invention provides for an off-the-record e-mail system that can ensure that messages, particularly sensitive messages, are available only for the intended recipient and never reside on permanent storage media. Control of the existence of the off-the-record e-mail can lie completely with the sender. The sender of the off-the-record e-mail sets the time-to-live (TTL) for the message content. When an off-the-record e-mail message is deleted, there is preferably no trace of the e-mail message on any computer backup system. The sender may also update the e-mail content at any time. The off-the-record e-mail system can include a personal server that combines the functions of a web server and an e-mail transfer server. The personal server may reside on an individual's personal workstation and might serve no one but that particular user. The personal server acts as a broker between the sender and the sender's SMTP server.

8 Claims, 3 Drawing Sheets

OFF-THE-RECORD E-MAIL METHODS AND APPARATUS

This non-provisional application claims the benefit of U.S. Provisional Application 60/155,650 filed Sep. 24, 1999, the subject matter of which is incorporated herein by reference. It also is a continuation of non-Provisional application Ser. No. 09/456,983, filed Dec. 7, 1999 now abandoned.

BACKGROUND OF THE INVENTION

1. Field of Invention

This invention relates to methods and apparatus for providing private e-mail service, where "private" means protected against unwanted disclosure during and after delivery.

2. Description of Related Art

In conventional e-mail systems, when an e-mail message is sent to a receiving party, the e-mail message must be routed through a chain of relay servers using Simple Mail Transfer Protocol (SMTP). These servers routinely back-up these e-mail messages to back-up storage devices such as hard disks or magnetic tapes. Therefore, when conventional e-mail is deleted, it is not totally destroyed, it is simply not readily available to the person deleting it. The e-mail message may continue to exist on the receiving mail server, and ultimately on backup tapes. These backup tapes, which may contain sensitive e-mail messages, are thus susceptible to retrieval by outside parties. Even if the e-mails recorded on the tapes are encrypted, they might still be recovered if the encryption/decryption keys are compromised, i.e., revealed. Conventional e-mail systems do not guarantee privacy, that is, protection from unwanted disclosure after delivery. Thus, there is a need for new technology which can provide an off-the-record manner in which to send and receive private e-mail messages.

SUMMARY OF THE INVENTION

The invention provides an off-the-record e-mail system that can ensure that messages, particularly sensitive messages, are available only for the intended recipient and never reside on a permanent storage media that may be accessed by other parties. Control of the existence of the off-the-record e-mail can lie completely with the sender or subscriber. There can be no intermediate entity associated with the existence of the e-mail content. The sender of the off-the-record e-mail can set the time-to-live (TTL) for the message content. For example, the e-mail content can live for as short as a few seconds or as long as decades. The existence of an off-the-record e-mail can be determined by other criteria instead of TTL. For example, the off-the-record e-mail can be deleted after n accesses or deleted after n unauthorized retrieving attempts. Additionally, the off-the-record e-mail can be made unavailable to the recipient but not deleted after it is expired, or deleted right after it is retrieved by the recipient, etc. However, when an off-the-record e-mail message is deleted, there is preferably no trace of the e-mail message on any computer backup system. The sender can also update the e-mail content at any time.

The off-the-record e-mail system can include a personal server that can combine the functions of a web server and an e-mail transfer server. The personal server can reside on an individual's personal workstation and serves no one but that particular user. The personal server can act as a broker between the sender and the sender's SMTP server. Therefore, the personal server preferably does not need to be backed-up to disk or magnetic tape.

The personal server can provide SMTP services only to the sender and hypertext transfer protocol (HTTP) services to both the sender and the receiver. The sender of the off-the-record e-mail creates the content of the e-mail and can store it in a file in the sender's personal server, where no backup needs to be implemented. The personal server can hold the e-mail content and generate a message pointer. The message pointer is a short message which can only indicate that there is an e-mail available, optionally the expiring time for the e-mail, and the web address (URL) of the message. No e-mail content information is contained in the message pointer.

Only the message pointer is preferably transferred outside of the personal server through a chain of SMTP server relays and eventually arriving at the recipient's mail server. Upon receiving the message pointer, the recipient can use a hyperlink in the message pointer to connect to the sender's personal server to retrieve the off-the-record message content. An authentication process and/or a proof of delivery/tracking process to limit access to the message URL may also be included.

When the personal server receives the HTTP request from the recipient's browser the off-the-record e-mail message content can be transferred in the, form of a web page to the recipient. The HTTP server can provide a point-to-point direct connection (which may be secured) between the personal server and the recipient's browser. HTTP standards allow the sender to disable the ability to cache the web page on the recipient's side, therefore, the message content is preferably only stored temporarily for display purposes.

Alternatively, when the personal server receives the HTTP request from the recipient's browser, the personal server may transfer, for example, a Java applet program, or any other object executable by the recipient's browser, to the recipient's browser. In this embodiment, the HTTP server can only transfer a Java program in the form of a web page to the recipient's browser. The recipient's browser can run this Java program. This Java program can go back to the personal server and pick up the e-mail content and display it on the recipient's screen. The Java program preferably receives the e-mail content instead of the recipient's browser. The Java program can have full control of the e-mail content. Executable objects other than Java applets could perform the task of delivering off-the-record e-mail in a save-inhibit form, as long as the executable objects are accepted by the recipient's browser.

Using a Java applet can make it very difficult for the recipient of the off-the-record e-mail to save the off-the-record e-mail content in text form. Once the off-the-record e-mail is in the recipient's hand, numerous preventing features may be incorporated by way of a Java Applet to prevent the recipient from saving the message in text form. For example, preventing features may include disabling cut and paste functions, disabling save to file functions and disabling print functions.

Off-the-record e-mail can be compatible with existing e-mail systems. Current e-mail tools may be used with the off-the-record e-mail system, including conventional authoring tools, SMTP servers outside of the sender's workstation, Post Office Protocol 3 (POP3) servers and/or Internet Message Access Protocol (IMAP) servers. Off-the-record e-mail may be made to exist either entirely within the firewall of a user's site or may exist cross-firewall.

In the case of existing entirely within the firewall of a user's site, none of the off-the-record e-mail needs to go outside of the user's site and it preferably does not have to be processed by a third party.

If desired, however, off-the-record e-mail messages can be sent outside the firewall, provided it is configured not to block the recipient's HTTP requests back to the sender's personal server. For example, a cross-firewall configuration may include a system using a dedicated proxy web server that takes the e-mail recipient's request from outside the firewall, goes to the sender's personal server to retrieve the desired message inside the firewall, and then relays the e-mail content to the recipient. Another example could be where a dedicated port number, assigned by a corporate computer system administration group, is used by all of the personal servers equipped to generate off-the-record e-mail within the corporation, provided that the Internet Protocol (IP) address of the personal server is visible from outside of the firewall. The firewall could be designed to not block requests from outside the firewall seeking these specific port numbers.

Encryption/decryption techniques may also be used in order to conceal the off-the-record e-mail content.

These and other aspects of the invention will be apparent or obvious from the following description.

BRIEF DESCRIPTION OF THE DRAWINGS

The invention is described in detail with reference to the following figures, wherein like numerals reference like elements, and wherein.

DETAILED DESCRIPTION OF PREFERRED EMBODIMENTS

The invention is described below in connection with an electronic mail system. That is, as described below, a sender creates e-mail using a personal server and transmits this e-mail content in the form of a web page to a recipient at a remote location. However, it will be appreciated that the invention can be used with other types of communication systems, including instant messaging systems, computer live chatting systems or other similar systems that send messages through a chain of relay servers.

Figure 1:
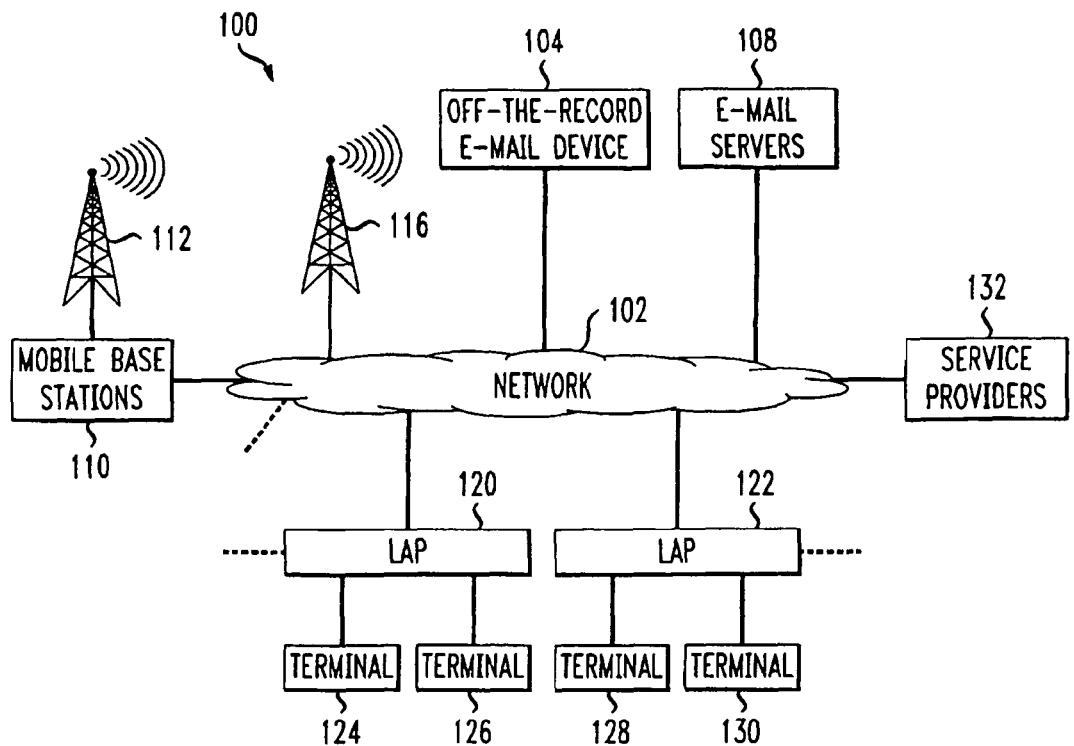
FIG. 1 shows an exemplary diagram of an off-the-record electronic mail system.

FIG. 1 shows an exemplary block diagram of an off-the-record electronic mail (OTR e-mail) system 100. The OTR e-mail system 100 includes a network 102 coupled to: an e-mail server 108, service providers 132, portable communication devices, such as cellphones via mobile base stations 110 and towers 112, pagers via paging towers 116, terminals 124-130 (e.g., telephone stations, personal computers, etc.) via local access providers (LAP) 120 and 122, and an OTR e-mail device 104.

The network 102 may include a telephone network (e.g., local and/or long distance), a data network such as the Internet, or other wired or wireless networks either private or public. The LAPs 102 and 122 may be local exchange carriers or other network interfaces such as Internet Service Providers.

A subscriber to the OTR e-mail system 100 may have subscribed to many other services. For example, the subscriber may have subscribed to a cellphone service, a pager service, an Internet service that receives e-mails from the e-mail server 108, and other types of services. With the present invention, the subscriber may send off-the-record e-mail messages using some or any one of these other services.

A user of the OTR e-mail system 100 can send confidential information to anyone without worrying that the content of the e-mail message will be saved on disk or backup tapes. The existence or nonexistence of the OTR e-mail can be solely under the control of the sender through his OTR e-mail device 104. The sender determines how long the OTR e-mail will be in existence and if it will be saved or not.

The OTR e-mail device 104 retains the OTR e-mail content within its domain and sends a message pointer to the recipient via the network 102 and e-mail servers 108. The e-mail server 108 sends an alert to the recipient to indicate that an e-mail message pointer has been received for the recipient. The message pointer identifies the web address of the message content and optionally the life span for the message. No OTR e-mail message content is preferably included in the message pointer.

Figure 2:
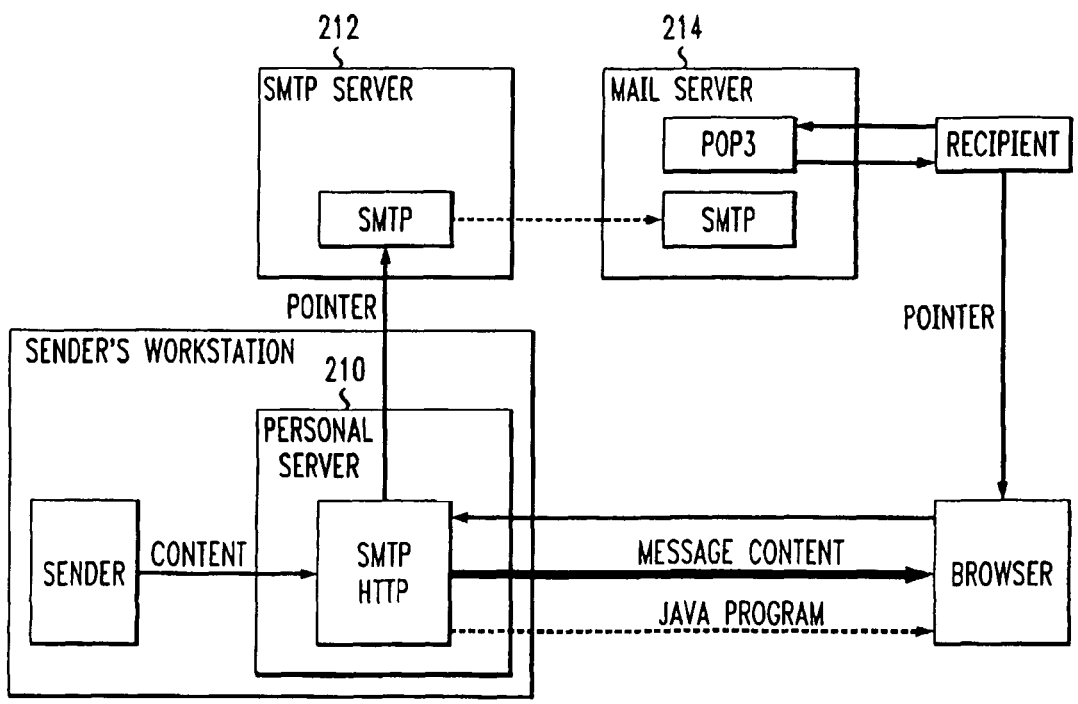
FIG. 2 shows an exemplary process for generating off-the-record electronic mail.

As shown in FIG. 2, the OTR e-mail device 104 proceeds along a process which can first send the content of an OTR e-mail message to a sender's personal server 210. The personal server 210 stores the OTR e-mail content and generates a message pointer including the web address of the message content. The message pointer is preferably transferred from the personal server 210 to the sender's SMTP server 212. The message pointer can travel through a chain of relays of SMTP servers until ultimately arriving at the recipient's mail server, shown as SMTP/POP3 214. After the recipient logs onto his server, e.g., by password authentication, the OTR e-mail message pointer can be sent to the recipient's workstation.

The e-mail subject line can contain some control keywords so that the e-mail author can tell the personal server 210 whether or not the current message is to be off-the-record. For example, a tag <CASUAL TTL=7 AC> in the subject line can mean that the e-mail is off-the-record (CASUAL), with a Time to Live (TTL) of 7 days after creation, and it should be delivered in a save-inhibit, e.g., anti-copy, form. This tag can be recognized by the personal server 210, but not sent to the recipient. Instead, this subject line can be used for control information so that the off-the-record feature will preferably be compatible with existing e-mail authoring tools.

Assuming the recipient has a web browser, the recipient can use his browser to go to the web address specified in the message pointer to either get the actual content of the OTR e-mail message in the form of a web page or to receive a Java program, or any other object executable by the recipient's browser, in the form of a web page. The Java program preferably acts as a broker for the OTR e-mail content.

The recipient's browser can run the Java program and the Java program can send a request to the personal server 210 to ask for the content of the OTR e-mail. In this situation, the Java program receives the content of the OTR e-mail and displays the content.

Figure 3:
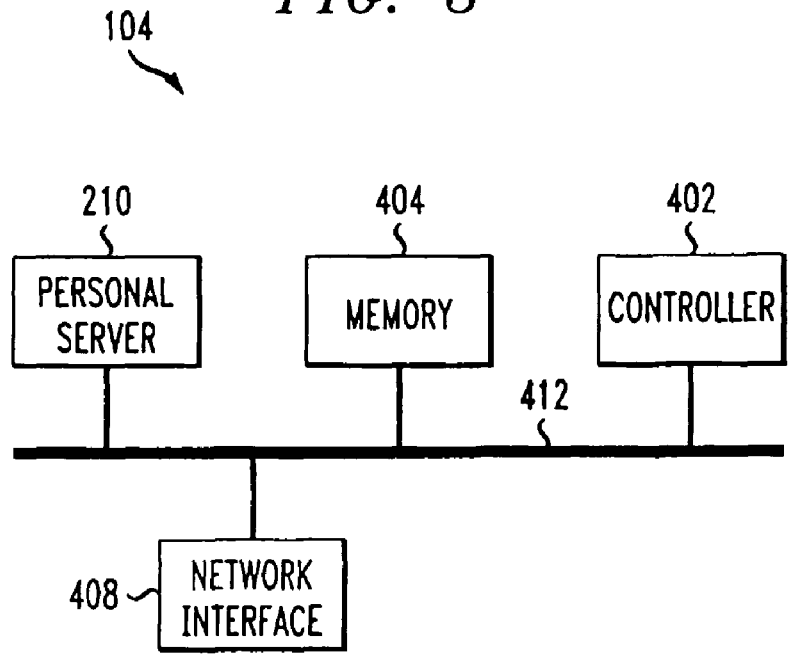
FIG. 3 shows an exemplary block diagram for an off-the-record electronic mail device.

FIG. 3 shows an exemplary block diagram for an OTR e-mail device 104. The OTR e-mail device 104 includes a controller 402, a memory 404, the personal server 210, and a network interface 408. The above components may be coupled together via a signal bus 412. While FIG. 3 shows a bus architecture, other hardware configurations may also be possible as is well known in the art. In addition, while FIG. 3 shows the controller 402 and the personal server 210 as separate units, the functions performed by these units may be combined or may be further divided among specified processors such as digital signal processors and/or performed by dedicated hardware such as application specific integrated circuits (ASIC) or other hardware implementations such as PLD, PAL or PLAs, for example.

Figure 4:
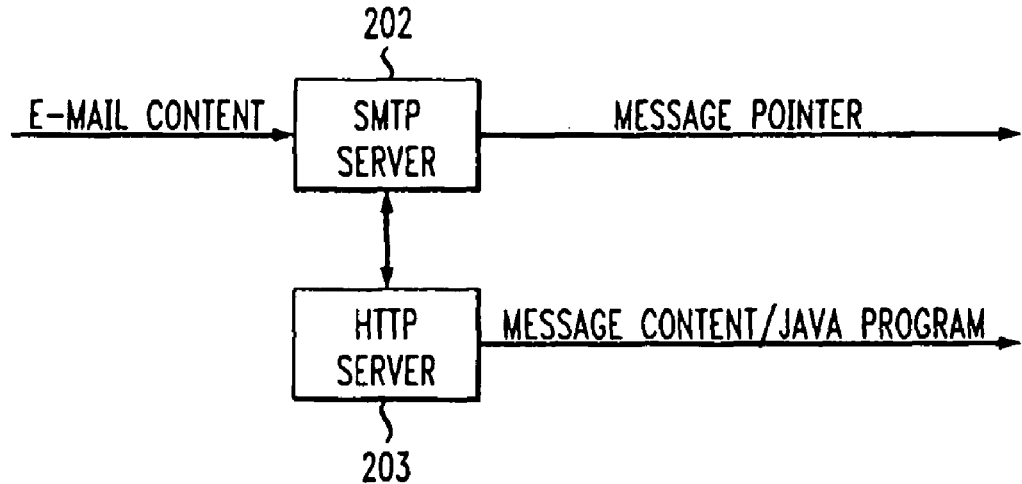
FIG. 4 shows an exemplary block diagram for a personal server shown in FIG. 3.

FIG. 4 shows an exemplary block diagram for a personal server 210. The personal server 210 can receive the OTR e-mail content via a personal SMTP server 202 and generate a message pointer for the OTR e-mail content. When the personal server 210 receives an HTTP request from the recipient's browser, after the recipient passes some possible authentication and/or access control process, the HTTP 203 can transfer either the OTR e-mail content or a Java program in the form of a web page to the recipient. The HTTP 203 protocol can prevent caching of the OTR e-mail content and provide a point-to-point direct connection from sender to recipient. Additionally, the HTTP sessions may be over a secured connection, for example Secure Sockets Layer (SSL).

Figure 5:
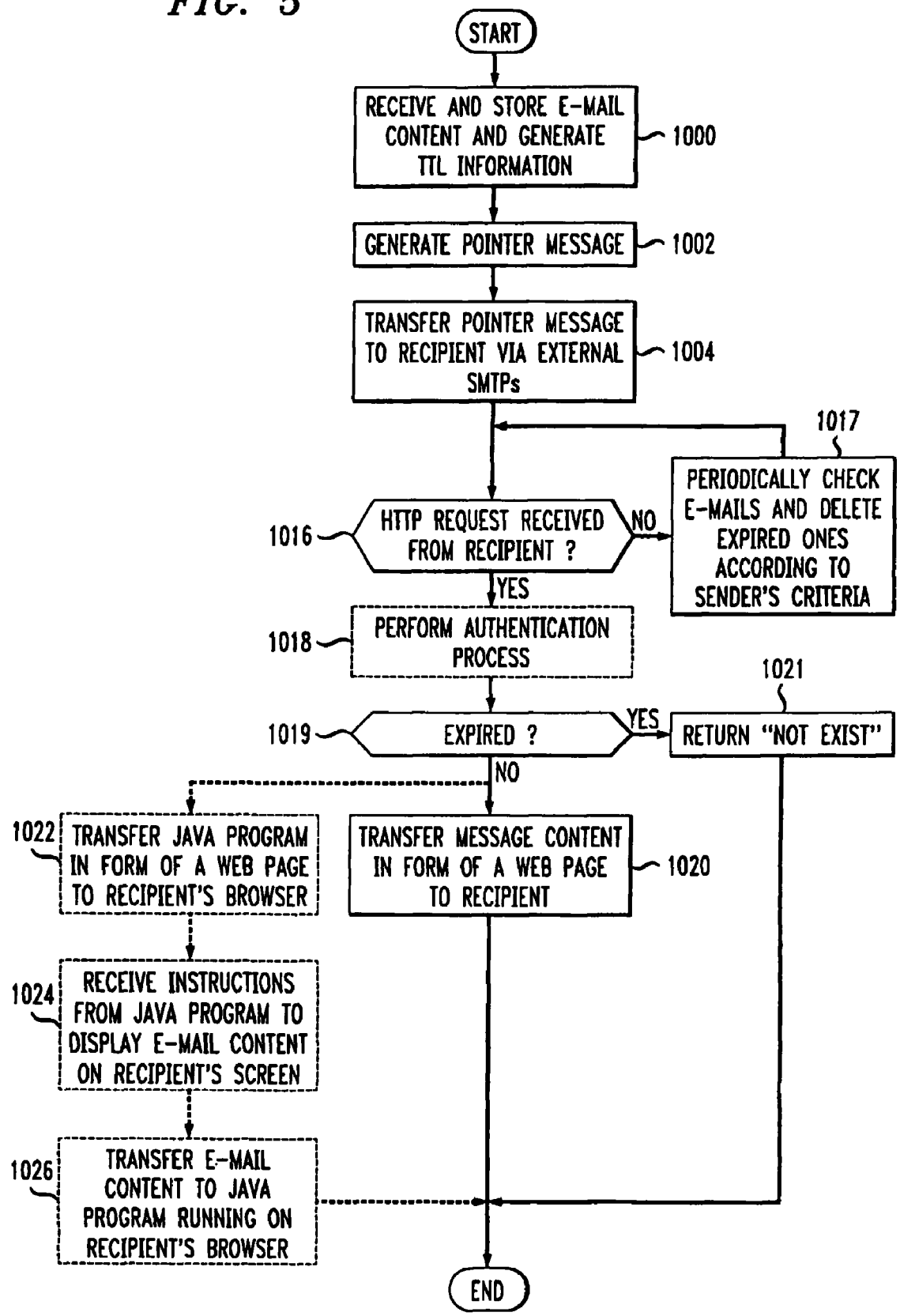
FIG. 5 shows a flowchart of an exemplary process of the personal server of the off-the-record electronic mail system.

FIG. 5 shows a flowchart for a process of the OTR e-mail device 104. In step 1000, the controller 402 receives and stores an OTR e-mail message and generates the time-to-live (TTL) information for it. In step 1002, the controller 402 generates a message pointer which includes the URL of the OTR e-mail message content and goes to step 1004. In step 1004, the controller 402 transfers the message pointer to the recipient of the OTR e-mail message via external SMTP servers.

The controller then goes to step 1016 and waits for a HTTP request from the recipient. If no HTTP request is received, the controller goes to step 1017 to periodically check all e-mails and delete expired ones according to the sender's criteria or policy. If the controller 402 receives an HTTP request, the controller 402 may go to step 1018 and perform an authentication process, confirming that the recipient is the correct receiver. If the authentication passes the controller 402 goes to step 1019 and checks if the requested e-mail is expired. If it is, the controller 402 returns "not exist" and terminates the HTTP session. Otherwise, the controller 402 can go to step 1020.

At step 1020, the controller 402 transfers the OTR e-mail content to the recipient in the form of a web page. Steps 1022-1026 are similar to step 1020 except that the controller 402 transfers a Java program to the recipient's browser instead of the OTR e-mail content. At step 1024, the controller 402 receives instructions from the Java program to send over the OTR e-mail content. At step 1026, the controller 402 transfers the OTR e-mail content to the Java program running on the recipient's browser.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. Various changes may be made without departing from the spirit and scope of the invention.

The invention claimed is:

1. A method for sending off-the-record Internet electronic mail from a message sender to a receiving device through the message sender's personal server in said message sender's personal workstation, comprising:
    storing an e-mail message on the personal server, wherein the message includes a subject line that determines whether or not the message is to be off-the-record,
    generating a message pointer on the personal server in the personal workstation,
    transmitting the message pointer to the receiving device through a first Internet connection,
    transmitting a request from the receiving device to the personal server,
    in response to the request, transmitting in read-only form the e-mail message from the personal server to the receiving device through a second Internet connection, wherein the message in read-only form is transmitted in a form that disables the ability to cache the message in the receiving device,
    wherein the first Internet connection is through at least one relay server and the second Internet connection is a secure point-to-point connection.

2. The method of claim 1, wherein generating the message pointer comprises indicating that there is a message available, and an Internet URL for the message.

3. The method of claim 1, wherein the transmitting the message pointer step comprises sending no message content.

4. The method of claim 1, wherein the transmitting the e-mail message in a read-only form step comprises transferring the message in the form of an Internet web page.

5. The method of claim 1, wherein the transmitting the message in a read-only form step comprises transferring a Java applet program to the receiving device.

6. The method of claim 1, further comprising one or more disabling methods of: disabling the ability of the receiving device to save the message, disabling the ability of the receiving device to cut and paste the message, disabling the ability of the receiving device to forward the message, disabling the ability of the receiving device to copy the message, or disabling the ability of the receiving device to print the message.

7. The method of claim 1, wherein the personal server deletes the message on the personal workstation based on one or more of: setting a time to live for the message, deleting the message after N accesses, and deleting the message after N unauthorized retrieval attempts.

8. The method of claim 1 wherein the first connection is a SMTP connection and the second connection is an HTTP connection.

* * * * *